(12) United States Patent
Olson

(10) Patent No.: US 12,177,221 B2
(45) Date of Patent: Dec. 24, 2024

(54) SYSTEM AND METHOD FOR IMPROVED SECURITY WHEN WORKING REMOTELY

(71) Applicant: PC Matic Inc, Sioux City, IA (US)

(72) Inventor: Anthony Olson, Dakota Dunes, SD (US)

(73) Assignee: PC MATIC, INC., Sioux City, IA (US)

( * ) Notice: Subject to any disclaimer, the term of this patent is extended or adjusted under 35 U.S.C. 154(b) by 438 days.

(21) Appl. No.: 17/826,926

(22) Filed: May 27, 2022

(65) Prior Publication Data

US 2023/0388307 A1    Nov. 30, 2023

(51) Int. Cl.
*H04L 9/40* (2022.01)
(52) U.S. Cl.
CPC .................. *H04L 63/101* (2013.01)
(58) Field of Classification Search
CPC .............................. H04L 63/101; H04L 63/10
See application file for complete search history.

(56) References Cited

U.S. PATENT DOCUMENTS

| | | | | |
|---|---|---|---|---|
| 9,152,694 | B1* | 10/2015 | Padidar | G06F 21/51 |
| 9,548,982 | B1* | 1/2017 | Karunakaran | H04L 63/0815 |
| 9,769,172 | B2* | 9/2017 | Hunukumbure | H04W 12/084 |
| 9,912,687 | B1* | 3/2018 | Wescoe | H04L 67/01 |
| 10,038,696 | B1* | 7/2018 | Marcovecchio | H04L 63/029 |
| 2009/0287705 | A1* | 11/2009 | Schneider | G06F 16/958 |
| | | | | 707/999.009 |
| 2013/0152169 | A1* | 6/2013 | Stuntebeck | H04L 67/51 |
| | | | | 726/4 |
| 2014/0282814 | A1* | 9/2014 | Barney | G06F 21/554 |
| | | | | 726/1 |
| 2016/0337382 | A1* | 11/2016 | Thomas | H04L 63/1408 |
| 2017/0134402 | A1* | 5/2017 | Boivie | G06F 21/53 |
| 2018/0205761 | A1* | 7/2018 | Jacobs | H04L 63/20 |
| 2020/0287933 | A1* | 9/2020 | Buck | H04L 61/4511 |

* cited by examiner

*Primary Examiner* — Kostas J Katsikis
(74) *Attorney, Agent, or Firm* — D2 Worldwide LLC; Frank Liebenow

(57) ABSTRACT

A system for computer security of a remote device having a processor includes a way to determine an operating mode of the remote device and a way to validate a resource (e.g., program, script, web address). When an attempt is made to access a resource, the operating mode of the remote device is determined and when the operating mode of the remote device is a corporate operating mode, then the resource is evaluated using a corporate protection file. Otherwise, when the operating mode of the remote device is determined to be a personal operating mode, then the resource is evaluated using a personal protection file. When the resource validation determines that the resource is approved, access to the resource is provided; otherwise, access to the resource is prevented.

14 Claims, 13 Drawing Sheets

SYSTEM AND METHOD FOR IMPROVED SECURITY WHEN WORKING REMOTELY

FIELD

This invention relates to computer security and more particularly to a system for providing enhanced security to those working remotely.

BACKGROUND

Corporations provide security models, software, and hardware that protect devices and data from being accessed by unauthorized personnel or from being hampered or disabled by external threats such as ransomware. Even with such, many security systems are violated by intruders, stealing vital data, user account information, client data such as social security numbers, or scrambling data and requesting huge sums to provide a key to unscramble the data (ransomware).

Corporate IT departments provide security measures to protect corporate devices and data systems from outside intrusion, guarding transactions between internal devices and external systems and limiting which external systems are accessible by such devices. Currently, when such devices migrate outside of the corporate realm, little or no protection is available or full corporate security is applied to the corporate device, thereby severely limiting user freedom and potentially functionality of the corporate device. Further, such protection, is equally applied to all corporate devices, indiscriminate of the corporate device being protected or the user of that corporate device, as various users have greater trust than others.

To make things worse, especially due to a recent pandemic, many users of corporate systems are now working remotely, for example, working from home. These remote users provide more challenges to corporate security specialists as corporate security must provide access to data and applications needed by remote workers while protecting the same from intrusion. The networks through which these remote users/workers access corporate networks are often not as secure as internal networks. To make this even more of a challenge, often the remote users provide their own devices such as laptop computers, desktop computers, smartphones, smartwatches, etc. In such, it is difficult for the corporate security specialist to control what software is installed on these devices and what type of non-work-related activities are performed by the remote user. There is little or no control as to what software is downloaded and installed on personal devices, little or no control as to the version of the operating system being used, little or no control as to browsing habits of the remote user, and little or no control over access to emails that the remote user might read and mistakenly open an attachment containing a virus or ransomware.

There exist several ways to protect against unwanted access of computers and data. For example, one way to restrict access is "what you know" (e.g., username/password), sometime enhanced by other information including geographic location and/or fixed data accessible within a device such as serial numbers, hardware addresses (e.g., MAC addresses), etc. Another way is to limit what software is able to run on certain computers by way of a whitelist (a list of programs that are allowed to run) or a blacklist (a list of programs that are always prevented from running). Another way is by software that analyzes programs or scripts before they are run to detect known virus software. Another way is to disable features in applications that allow activation of viruses, for example, disabling the ability of an email program to open attachments. Another way is through employee education and employee manuals, informing employees regarding what computer interactions are allowed/appropriate and what interactions are not allowed or are not appropriate.

It is known for corporate infrastructure technology software and policies to provide a safe computing environment to corporate computers through virus prevention programs and mechanisms like those above, but with recent movements to a more "work-at-home" scenario, such has been weakened as employees who work at home need to access corporate computers and datacenters through the employee's at-home network and the Internet. It is also well known that many home networks and Internet access is not well protected from eavesdropping, receiving viruses, data stealing, etc. To further complicate providing a safe computing environment for those who work from home is the fact that many such workers provide their own devices such as laptop computers, smartphones, tablet computers, etc. Being that these devices are owned by the employee, it is difficult for corporations to dictate which computer interactions are allowed/appropriate and which interactions are not allowed or are not appropriate, especially when the employee owns the device and uses the device during non-work hours.

What is needed is a system that will provide corporate security on a remote device that accesses corporate resources while providing users the freedom to access the Internet directly.

SUMMARY

A system for protecting a computer-based device in a way similar to a corporate system is described. The system uses similar mechanisms as the corporate network when the computer-based device accesses corporate resources.

In one embodiment, a system for computer security of a remote device is disclosed. The remote device has a processor with software running thereon. When an attempt to access a resource occurs, the software first determines an operating mode of the computer and when the operating mode of the computer is a corporate operating mode, then the software selects a corporate protection file as a protection file; otherwise, when the operating mode of the computer is a personal operating mode, then the software selects a personal protection file as a protection file. The software then validates the resource using the protection file and when the protection file indicates that the resource is approved, access to the resource is provided; otherwise, access to the resource is prevented.

In another embodiment, method of protecting remote device that has a processor is disclosed. The method includes installing security software on the remote device which runs before providing general access of the remote device by a user. Upon attempting access to a resource, the security software determines an operating mode of the remote device and when the operating mode indicates a corporate-use operating mode, the security software evaluates the resource based upon corporate-use rules and if the corporate-use rules allow access to the resource, the security software allowing access to the resource. Otherwise, the security software prevents access to the resource. When the operating mode indicates a personal-use operating mode, the security software evaluates the resource based upon personal-use rules and if the personal-use rules allow access to the resource, the security software allowing access to the resource.

In another embodiment, a system for computer security of a remote device having a processor has a way to determine an operating mode of the remote device and a way to validate a resource (e.g., program, script, web address). When an attempt is made to access a resource, the operating mode of the remote device is determined and when the operating mode of the remote device is a corporate operating mode, then the resource is evaluated using a corporate protection file. Otherwise, when the operating mode of the remote device is determined to be a personal operating mode, then the resource is evaluated using a personal protection file. When the resource validation determines that the resource is approved, access to the resource is provided; otherwise, access to the resource is prevented.

BRIEF DESCRIPTION OF THE DRAWINGS

The invention can be best understood by those having ordinary skill in the art, by referencing the following detailed description when considering the accompanying drawings, in which.

DETAILED DESCRIPTION

Figure 1:
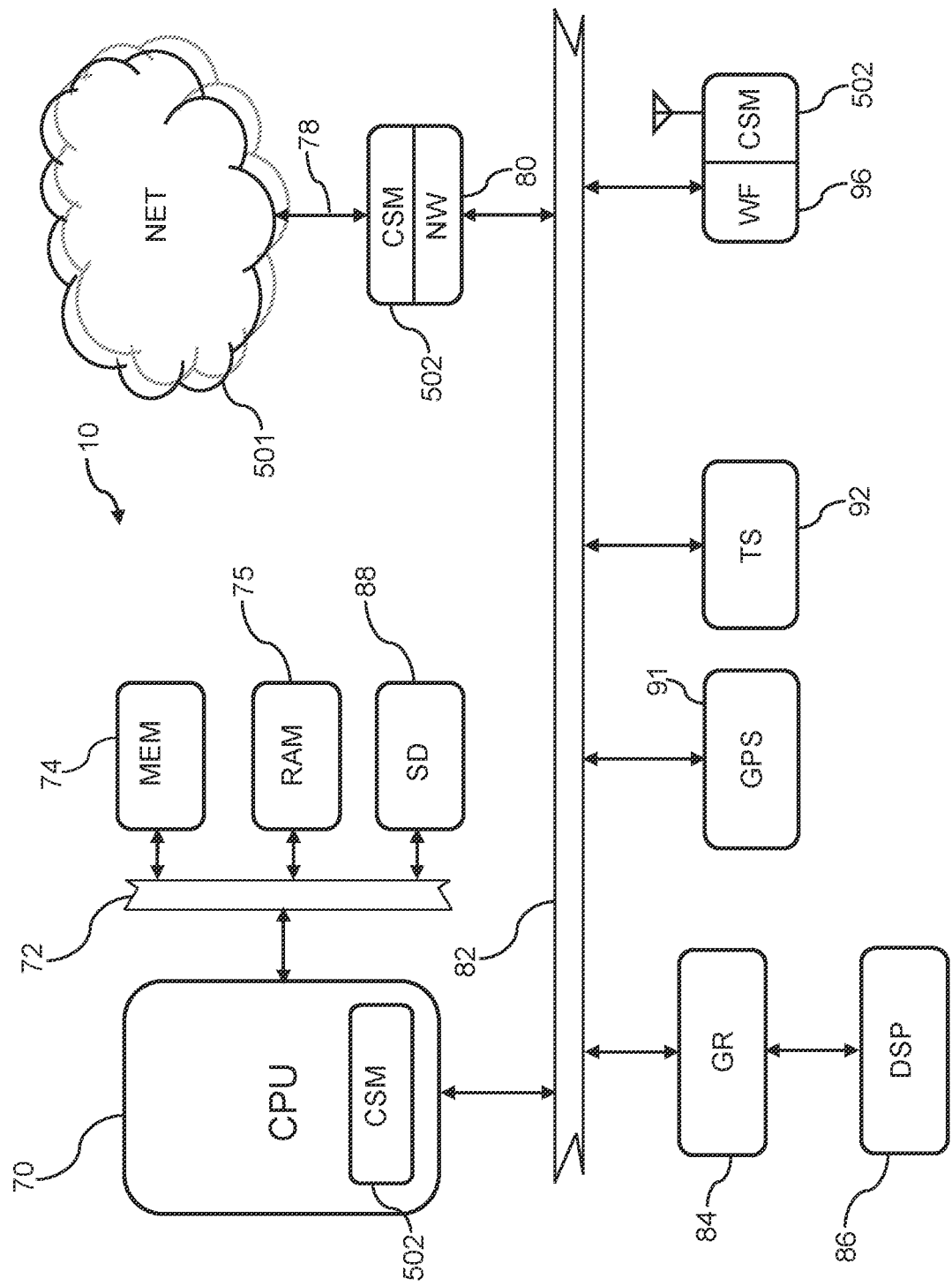
FIG. 1 illustrates a schematic view of a typical computer protected by a corporate security system.
Figure 2:
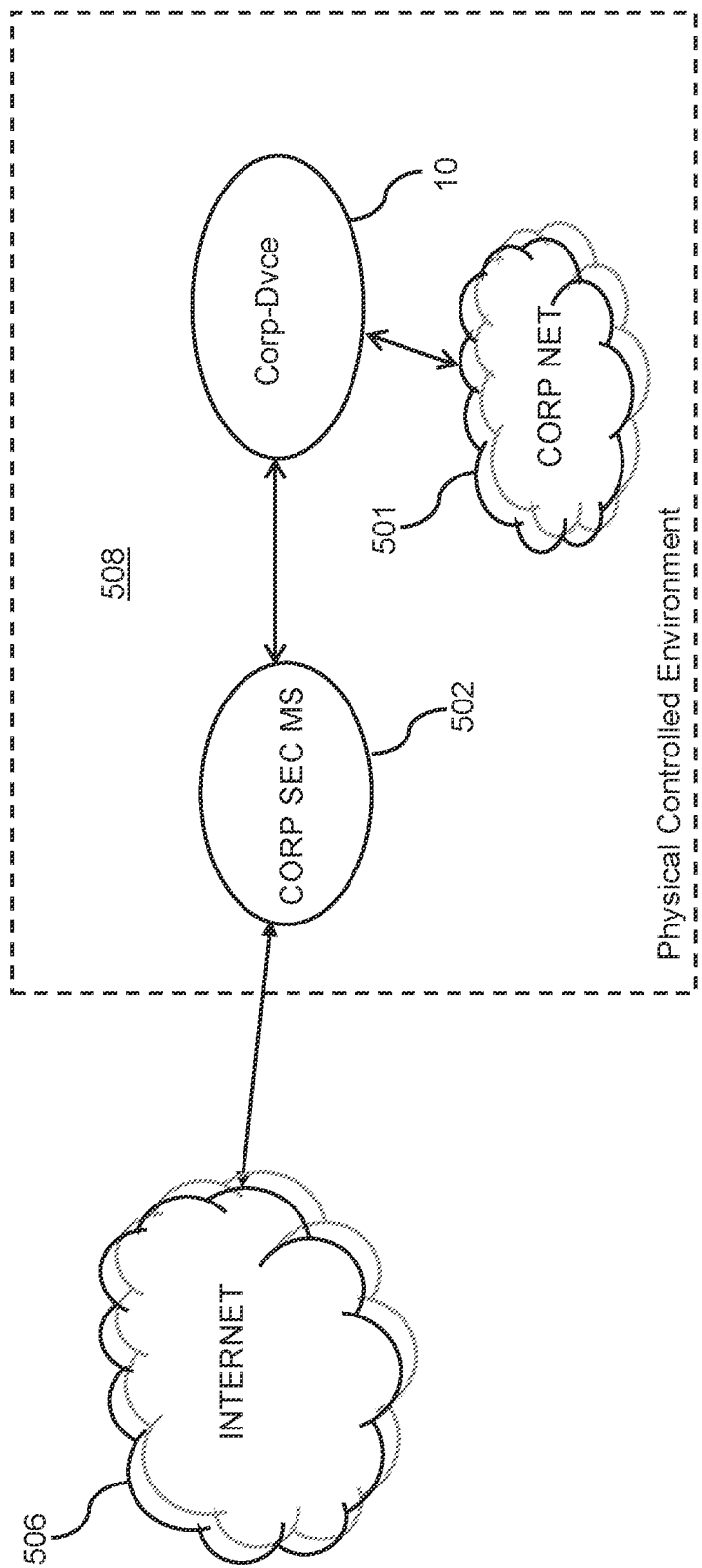
FIGS. 2-5 illustrate data connection diagrams of systems of the prior art.

Reference will now be made in detail to the presently preferred embodiments of the invention, examples of which are illustrated in the accompanying drawings. Throughout the following detailed description, the same reference numerals refer to the same elements in all figures.

Throughout this description, the term, "computer" refers to any system that has a processor and runs software. One example of such is a personal computer. Another example is a smartphone or tablet. The term, "user" refers to a human that has an interest in the computer, perhaps a user who is using the computer.

Throughout this description, for clarity reasons, the term "file" or "folder" represents a resource. In general, a file refers to a container of data but is not restricted to a specific type of file (e.g., a collection of blocks of disk storage) as the term "file" is a way of referring to stored data in any way of storing the data. Likewise, the term "folder" represents a way of organizing files, often in a hierarchical form, but without restriction.

Referring to FIG. 1, a schematic view of a typical corporate device 10 of the prior art is shown. This corporate device 10 (e.g., computer, tablet, smartphone) is typically found in a corporate environment for computing and accessing corporate data through corporate security measures 502.

Note that, although the examples of corporate devices 10 shown and discussed are processor-based, it is equally anticipated that some such devices be logic based, for example, remote security cameras and water intrusion detectors.

The exemplary corporate device 10 represents a typical device used for computing, communicating, and accessing data services. Different architectures are fully anticipated that accomplish similar results in a similar fashion, and the present invention is not limited in any way to any particular corporate device 10 system architecture or implementation. In this corporate device 10, a processor 70 executes or runs programs in a random-access memory 75. The programs are generally stored within a persistent memory 74 and loaded into the random-access memory 75 when needed. In some devices 10, a removable storage slot 88 (e.g., compact flash, SD) offers removable persistent storage. The persistent memory 74, and random-access memory 75 are connected to the processor by, for example, a memory bus 72. The random-access memory 75 is any memory suitable for connection and operation with the processor 70, such as SRAM, DRAM, SDRAM, RDRAM, DDR, DDR-2, etc. The persistent memory 74 is any type, configuration, capacity of memory suitable for persistently storing data, for example, flash memory, read only memory, hard drives, solid-state drives, battery-backed memory, etc. In some exemplary devices 10, the persistent memory 74 is removable, in the form of a memory card of appropriate format such as SD (secure digital) cards, micro-SD cards, compact flash, etc.

Also connected to the processor 70 is a system bus 82 for connecting to peripheral subsystems such as a network interface 80, a graphics adapter 84 and a touch screen interface 92. The graphics adapter 84 receives commands from the processor 70 and controls what is depicted on the display 86. The touch screen interface 92 provides navigation and selection features.

In general, some portion of the persistent memory 74 and/or the removable storage 88 is used to store programs, executable code, phone numbers, contacts, and data, etc. In some embodiments, other data is stored in the persistent memory 74 such as audio files, video files, text messages, etc.

The peripherals are examples, and other devices are known in the industry such as global positioning subsystems, speakers, microphones, USB interfaces, cameras, microphones, Bluetooth transceivers, Wi-Fi transceivers 96, image sensors, temperature sensors, etc., the details of which are not shown for brevity and clarity reasons.

The network interface 80 connects the corporate device 10 to the corporate network 501 through any known or future protocol such as Ethernet, Wi-Fi, GSM, TDMA, LTE, etc., through a wired or wireless medium 78. There is no limitation on the type of cellular connection used. The network interface 80 provides data and messaging connections between the corporate computer 10 and other corporate computing devices through the corporate network 501.

In this, the corporate device 10, being located within the corporation, has corporate security measures 502 integrated/installed in the hardware and software of the corporate device 10. It is noted that there are numerous other cooperating devices on which the corporate security measure 502 are installed within the architecture and environment of the corporate device 502, for example, routers, bridges, and mobile hotspots. These corporate security measures 502 help assure that malicious software, data stealing, unauthorized access, viruses, security data loss will not occur. Examples of such corporate security measures include, but are not limited to, whitelists, blacklists, virus protection software, software configurations, etc. For example, if the user of the corporate device 10 receives an email with an attached script or executable and tries to open the attachment, the corporate security measures 502 that includes whitelisting will determine that the attachment is not on the whitelist and prevent execution.

Referring to FIGS. 2-5, data connection diagrams of systems of the prior art are shown. It is known that many computer system attacks emanate from outside the walls of the corporation 508 and, likely, from the Internet 506. Many attacks emanate from a message from an external party or from a user browsing to a dangerous website, either by choice or because the user mistyped a URL. Many corporations have been severely hurt by viruses or ransomware that gets into the corporate device 10 attached to an email or upon clicking on a website by a user, then replicating itself throughout the corporate infrastructure 501. Corporate Information Technology (IT) personnel deploy corporate security measures 502 that helps prevent such attacks by limiting the activities of a user operating a corporate device 10, for example, whitelisting websites that are known to be trustworthy and/or blacklisting websites that are known to be dangerous.

In some corporate systems of the prior art, remote access is provided to a remote device 12. The remote device 12 is any device similar or different from the corporate device 10.

Figure 3:
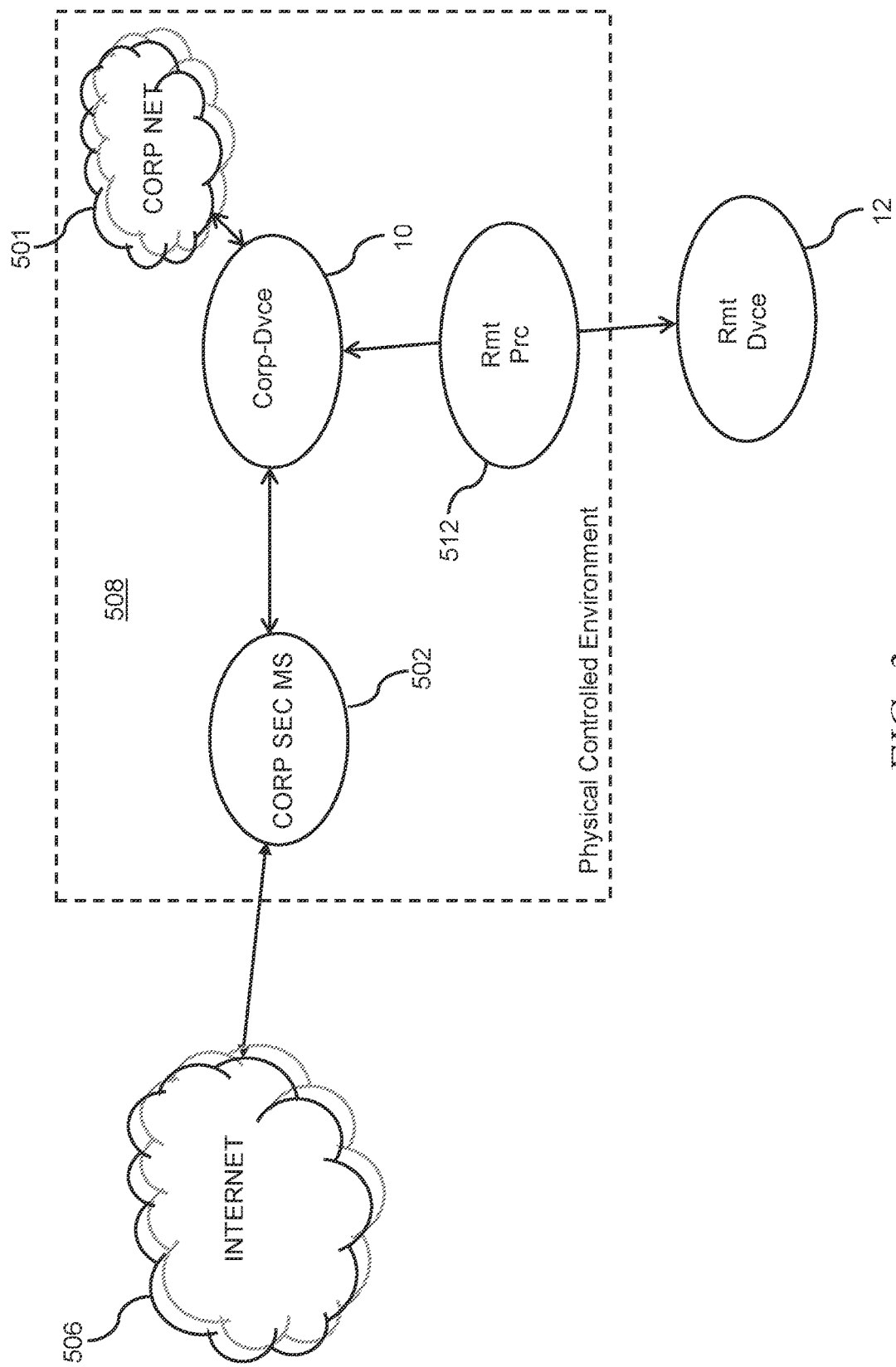

In FIG. 3 showing a prior home device network connection, the remote device 12 is connected to the corporate device 10 and indirectly accesses the corporate resources through the corporate device 10 and the corporate network 501, in this example using a remote-PC process/protocol 512.

Figure 4:
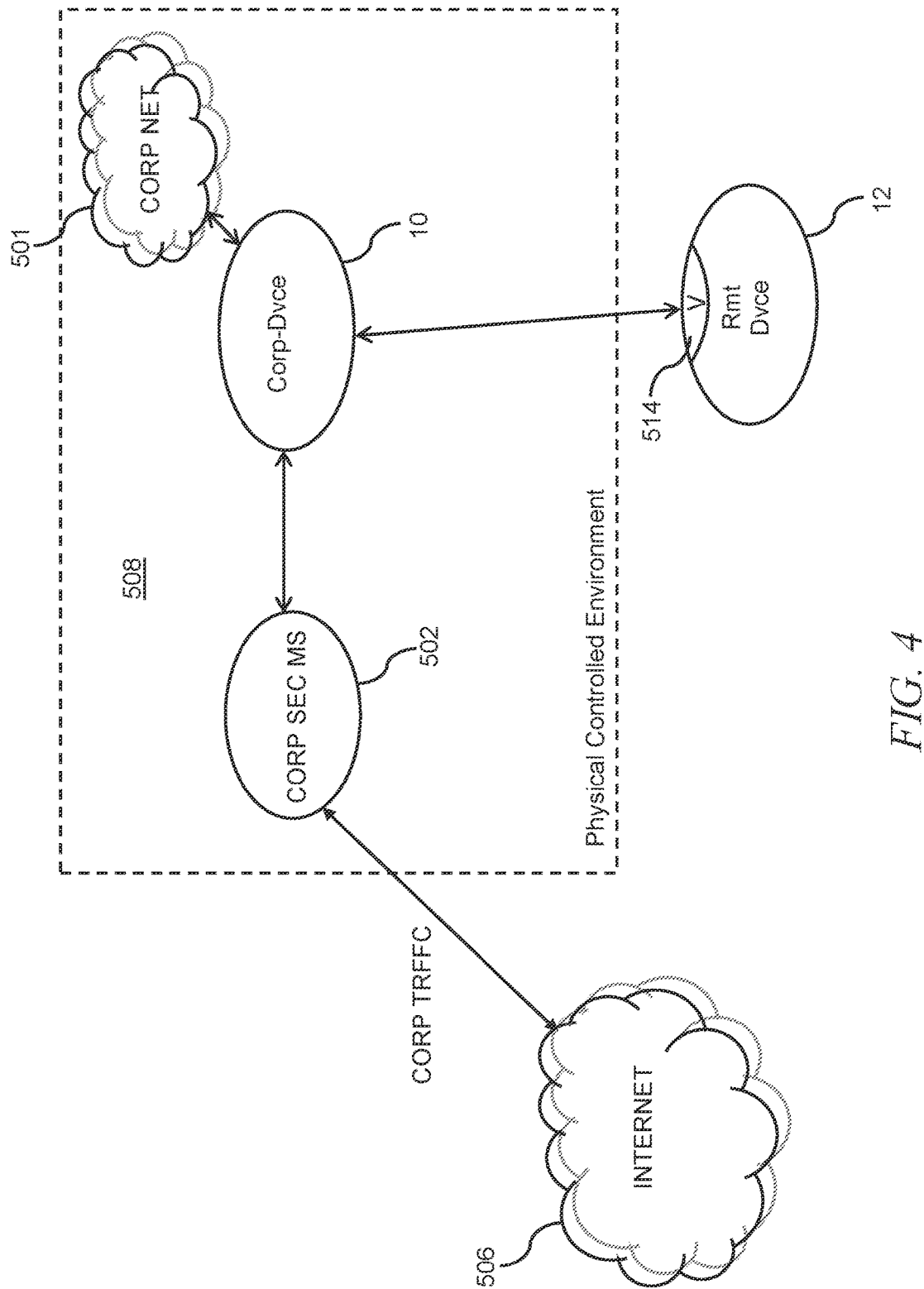

In FIG. 4 showing a prior home device network connection, the remote device 12 is connected to the corporate device 10 and indirectly accesses the corporate resources through the corporate device 10 and the corporate network 501, in this example using a virtual private network 514 (VPN).

Figure 5:
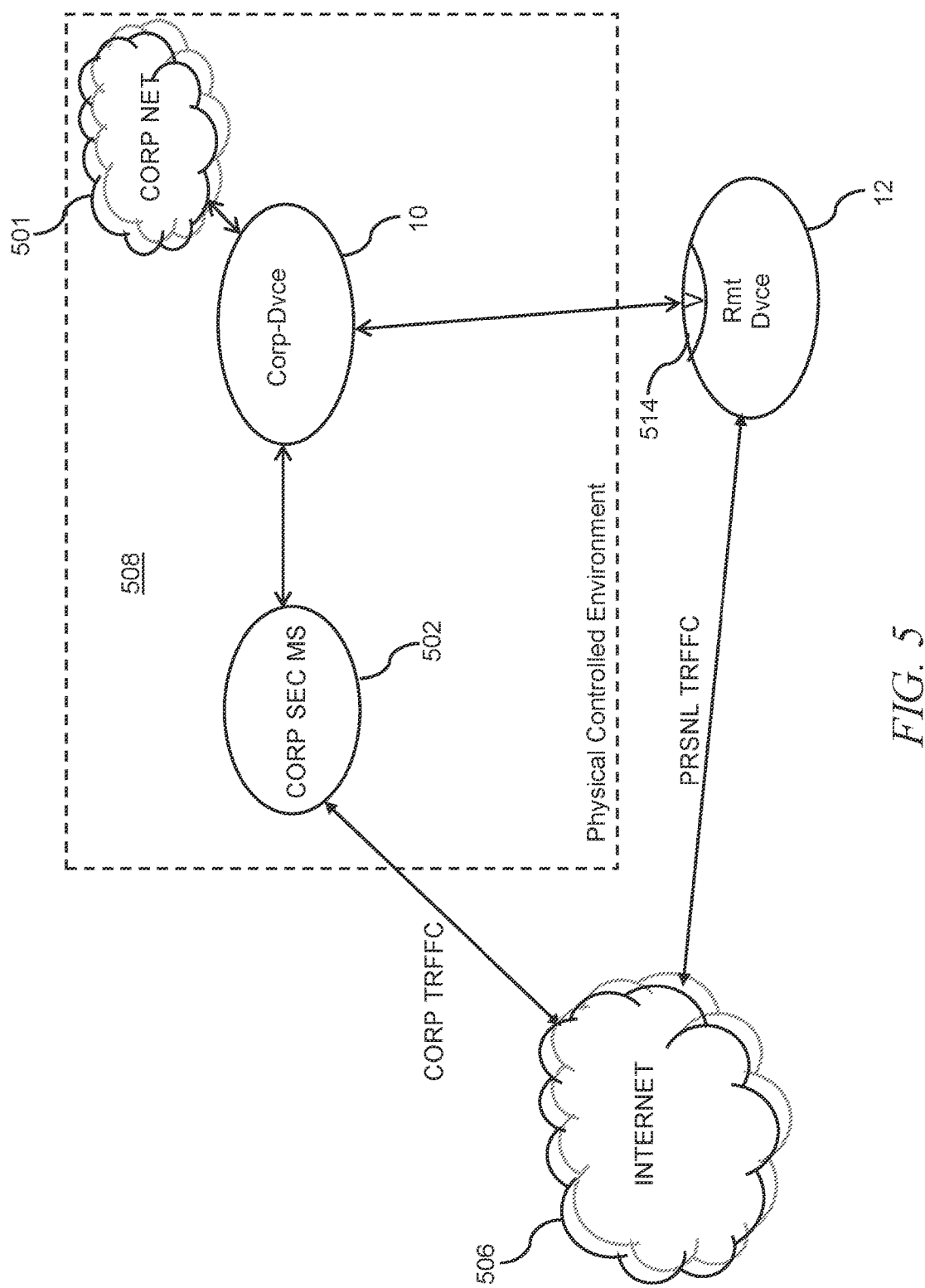

In FIG. 5 showing a prior home device network connection, the remote device 12 is again connected to the corporate device 10 and indirectly accesses the corporate resources through the corporate device 10 and the corporate network 501, in this example using a virtual private network 514 (VPN). In this example, the remote device 12 is also connected to the Internet 506 through a non-corporate network providing personal access to the Internet 506 as is often provided for the employee acting as a private individual using a personal computer or the like. In such, the employee uses the remote device 12 freely to browse the Internet 506, send/receive email, view streaming video, etc. Unfortunately, often embedded in the email or on web pages that the employee visits are contaminated with various types of malicious attachments such as viruses, ransomware, etc. If this contamination occurs when the employee is accessing corporate data or has corporate data stored locally, the corporate data is vulnerable to theft, modification, sabotage, or ransom.

Figure 6:
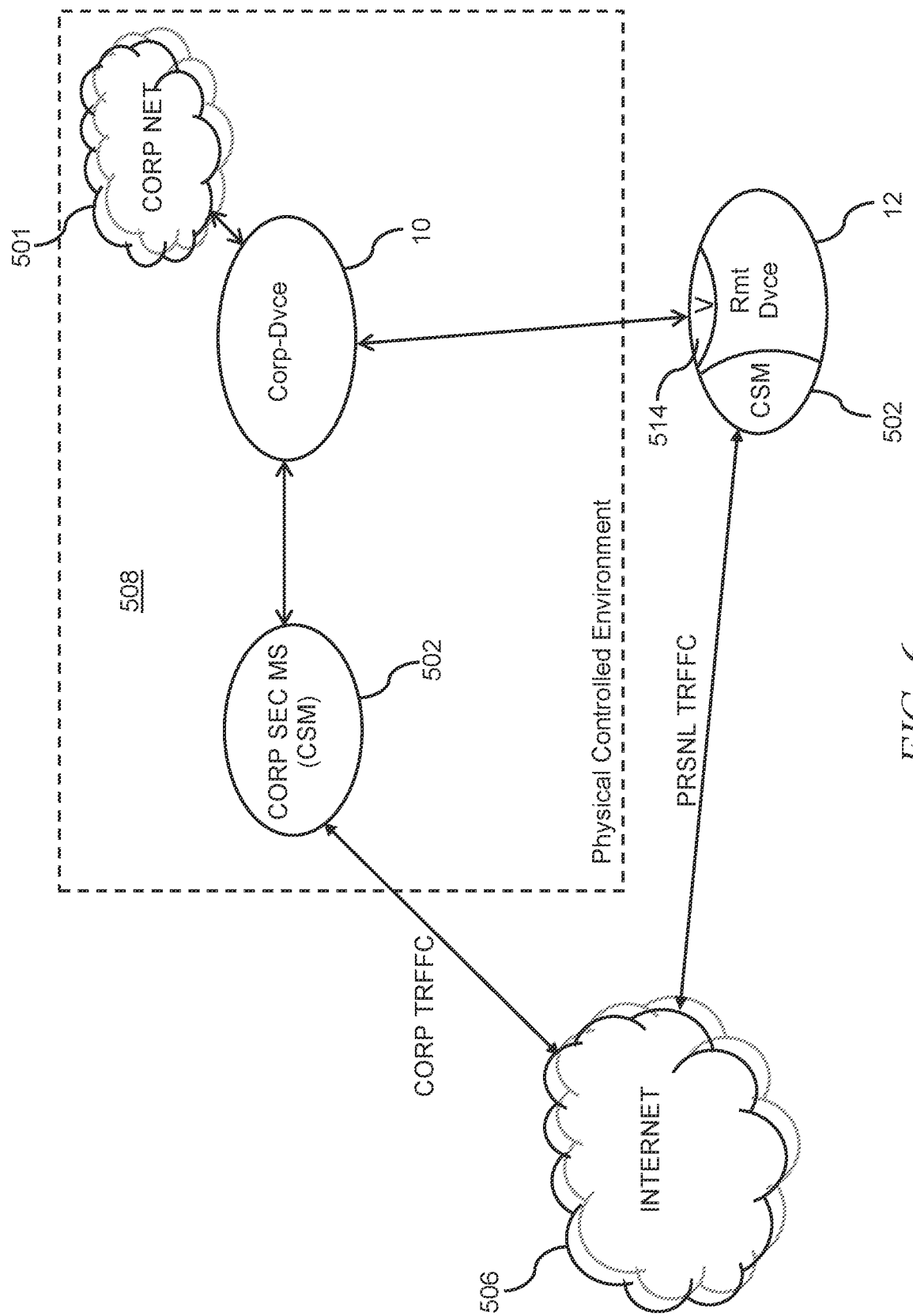
FIG. 6 illustrates a data connection diagram of the system for improved security when working remotely.

Referring to FIG. 6, a data connection diagram of the system for improved security when working remotely. In FIG. 6, the remote device 12 is again connected to the corporate device 10 and indirectly accesses the corporate resources through the corporate device 10 and the corporate network 501, in this example using a virtual private network 514 (VPN). In this example, the remote device 12 is also connected to the Internet 506 through a non-corporate network providing personal access to the Internet 506 as is often provided for the employee acting as a private individual using a personal computer or the like. In this model, corporate security measures 502 are integrated into the remote device, providing control of traffic to/from the remote device. In such, as the employee uses the remote device 12 to browse the Internet 506, send/receive email, view streaming video, etc., the corporate security measures 502 restrict such personal traffic to that which is safe given the particular employee as well as the current access that the remote device has to the corporate network.

For example, the corporate security measures 502 includes blacklists and whitelists the limit execution of certain programs/scripts. In such, the employee is not permitted to run certain programs/scripts that are known to be dangerous or the employee is only allowed to run certain programs/scripts that are known to be safe.

In some embodiments, the corporate security measures 502 (e.g., security software) determines an operating mode of the remote device 12 and adjusts operation depending upon what connections are made to the corporate network 501, for example loading a certain protection file such as a corporate protection file containing whitelist entries. For example, when the remote device 12 is connected to the corporate network 501 through the VPN 514 and the corporate device 10, the corporate security measures 502 determine a corporate operating mode and implement the strictest rules that limit access to certain resources (e.g., execution of certain programs/scripts), for example by loading a certain protection file or corporate-use rules such as a corporate protection file containing whitelist entries. When there is no connection to the corporate network 501, the corporate security measures 502 determine a personal operating mode and implement relaxed rules such as personal-use rules or load personal protection files that limit access to certain resource (e.g., execution of certain programs/scripts) to help keep the remote device 12 safe from intrusions, but allow the employee to access web sites and programs/scripts that are not typically allowed from the corporate environment. For example, in the corporate environment, the corporate security measures 502 do not allow access to gaming web sites or video content web sites (e.g., to restrict employees from playing games or watching video while at work), but at home, the employee is free to use their own resources (e.g., remote device 12) for such activities. Therefore, when disconnected from the corporate network 501, the remote device 12 is able to access certain web sites, programs, and scripts that are not allowed when connected to the corporate network. Still, for protection of the device, various prudent security measures are still in force to help protect the remote device 12.

In some embodiments, the corporate security measures 502 determine the operating mode of the remote device 12 and adjusts operation depending upon a level, role, or rank of the employee, providing greater freedom to employees that are highly trusted. For example, for an entry level employee, the corporate security measures 502 provides the strictest rules that limit execution of certain programs/scripts. For a senior level employee (e.g., a director), the corporate security measures 502 implement relaxed rules that limit execution of certain programs/scripts to help keep the remote device 12 safe from intrusions. In another example, a director-level employee working in marketing (a marketing role) is provided with a certain set of rules while a director-level (e.g., same level) working in information technology (a technology role) is provided with a more relaxed set of rules as this person is likely to be more aware of dangers. In such, the corporate IT function is able to categorize employees as deemed based upon whatever criteria desired such as title, pay, pay grade, organization, current role, time with the company, prior history of incidents, etc.

In some embodiments, the geographical location of the remote device 12 and/or time at the remote device 12 are considered in determining the operating mode. For example, the corporate security measures 502 will implement extremely stringent protection for the remote device 12 (e.g., a smartphone) when that remote device 12 is located outside of an expected geographic region such as the employee's home city, unless the travel is pre-approved by corporate security (e.g., travel on a work-related trip). Another example is an employee who performs work functions between 9:00 AM and 5:00 PM, Monday-Friday. During the work hours, the corporate security measures 502 will implement normally stringent protection for a remote device 12, but outside of the work hours, the corporate security measures 502 will implement relaxed protection for a remote device 12, allowing the employee to use the remote device 12 for personal reasons.

In some embodiments, there are multiple whitelists/blacklists, each corresponding to parameters such as geographical locations, the user's security level (e.g., position within the corporation or trust level), the time/date, etc., though as shown, a single whitelist/blacklist (or other security file) is anticipated having notations indicating which entries are used based upon operating mode, geographical location, security lever, time/date, etc. Note that in the examples shown, for clarity and brevity reasons, only corporate use and personal use are shown, though the above noted parameters are equally anticipated, for example, using pay-grades of "CEO", "Director," and "Other."

One way for the corporate security measures 502 to provide relaxed rules that limit execution of certain programs/scripts while enabling the remote device 12 safe from intrusions is through multi-level whitelist and/or blacklist. In multi-level whitelisting and/or blacklisting, there are two or more whitelists and/or blacklists, one providing strict rules and one providing relaxed rules. In some embodiments, a first whitelist and/or blacklist is provided by corporate security and the first whitelist and/or blacklist is in force when the strictest rules are needed (e.g., when connected to the corporate network 501 and/or when an entry level employee is using the remote device 12). The second whitelist and/or blacklist is in force when relaxed rules are in force, for example, when not connected to the corporate network 501 and/or when a senior level employee is using the remote device 12.

In some embodiments, corporate security provides each whitelist and/or blacklist. As an example, when the remote device 12 is connected to the corporate network 501, a first corporate-provided blacklist implements strict rules that preclude access to gaming web sites by the remote computer and when the remote device 12 is not connected to the corporate network 501, a second corporate-provided blacklist implements relaxed rules allowing access to gaming web sites by the remote computer, but still preventing access to web sites that are known to have malicious software.

Figure 7:
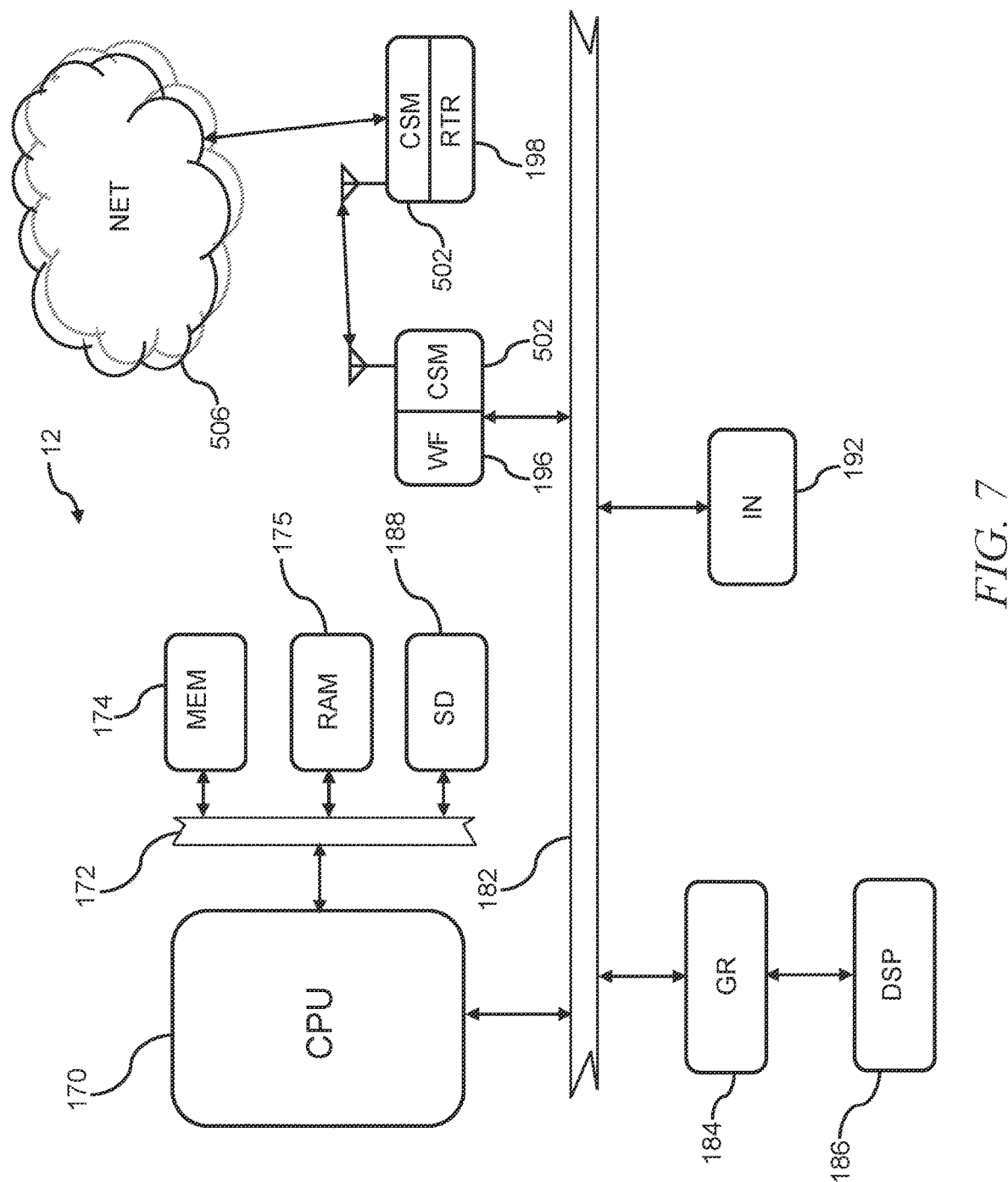
FIG. 7 illustrates a schematic view of an exemplary user device.

Referring to FIG. 7, a schematic view of a remote device 12 being used at a location away from the office. This remote device 12 (e.g., computer, tablet, smartphone) is typically used to remotely access a corporate environment for computing and accessing corporate data through corporate security measures 502. Although one type of remote device 12 is shown, many remote devices 12 are anticipated with a wide variety of features and capabilities, processing power, memory, storage, communications type/bandwidth, location detection, displays, input devices, etc. Each class of such device has its own challenge as to what types of corporate security measures 502 are possible without rendering the remote device 12 useless for the intended purpose. For example, loading a whitelist having thousands of entries into the memory of a smartwatch will leave little room for storage of contacts or other data files, and is such is loaded, searching of this whitelist with each access attempt will require substantial amounts of the available processing power. Therefore, if such security measure 502 is loaded on a smartwatch, the smartwatch will no longer perform well and this corporate security measure 502 will likely be removed by the user.

Further, once external to the corporation, the remote device 12 has a user, and not all users are equivalent. For example, it is assumed that the CEO and CFO of the corporation are totally trusted and will not perform risky activities with their remote device 12. In contrast, it is not known if a new hire in sales will use their remote device 12 to visit sites that are known to be contaminated with viruses or use their remote device 12 to click on an attachment to an email that contains a virus.

The exemplary remote device 12 represents a typical device used for computing, communicating, and accessing data services. Different architectures are fully anticipated that accomplish similar results in a similar fashion, and the present invention is not limited in any way to any particular remote device 12 system architecture or implementation. In this remote device 12, a processor 170 executes or runs programs in a random-access memory 175. The programs are generally stored within a persistent memory 174 and loaded into the random-access memory 175 when needed. In some remote devices 12, a removable storage slot 188 (e.g., compact flash, SD) offers removable persistent storage. The persistent memory 174, and random-access memory 175 are connected to the processor by, for example, a memory bus 172. The random-access memory 175 is any memory suitable for connection and operation with the processor 170, such as SRAM, DRAM, SDRAM, RDRAM, DDR, DDR-2, etc. The persistent memory 174 is any type, configuration, capacity of memory suitable for persistently storing data, for example, flash memory, read only memory, hard drives, solid-state drives, battery-backed memory, etc. In some exemplary remote devices 12, the persistent memory 174 is removable, in the form of a memory card of appropriate format such as SD (secure digital) cards, micro-SD cards, compact flash, etc.

Also connected to the processor 170 is a system bus 182 for connecting to peripheral subsystems such as a graphics adapter 184 and an input device interface 192. The graphics adapter 184 receives commands from the processor 170 and controls what is depicted on the display 186. The input device interface 192 provides navigation and selection features from input devices such as touch screens, keyboards, mice, and pointing devices.

In general, some portion of the persistent memory 174 and/or the removable storage 188 is used to store programs, executable code, phone numbers, contacts, whitelists, blacklists, and data, etc. In some embodiments, other data is stored in the persistent memory 174 such as audio files, video files, text messages, etc.

The peripherals are examples, and other devices are known in the industry such as global positioning subsystems, speakers, microphones, USB interfaces, cameras, microphones, Bluetooth transceivers, image sensors, temperature sensors, etc., the details of which are not shown for brevity and clarity reasons.

The Wi-Fi interface 196 connects the remote device 12 to the network 506 through any known or future protocol such as Ethernet, Wi-Fi, GSM, TDMA, LTE, etc., typically through a wireless router 198. There is no limitation on the type of connection used and Wi-Fi is a widely-used interface, especially in homes. The Wi-Fi interface 196 provides data and messaging connections between the remote device 12 and other corporate computing devices through the corporate network 506.

In this embodiment, the remote device 12 has corporate security measures 502 integrated/installed in the hardware and software of the remote device 12 and, in some embodiments, the corporate security measures 502 are also installed in the wireless router 198 (e.g., firewall settings). These corporate security measures 502 help assure that malicious software, data stealing, unauthorized access, viruses, security data loss will not occur. Examples of such corporate security measures include, but are not limited to, whitelists, blacklists, firewalls, virus protection software, software configurations, etc. For example, if the user of the remote device 12 receives an email with an attached script or executable and tries to open the attachment, the corporate security measures 502 that includes whitelisting will determine that the attachment is not on the whitelist and prevent execution.

Corporate security measures 502 often include data driven from tables of indicators of levels of danger. For example, antivirus programs have scripts or heuristic tables that are used to analyze incoming files for the presence of a virus, tables (whitelist) of programs/scripts that are allowed to run and websites that are permitted, and/or tables (blacklist) of programs/scripts that are prohibited from running and websites that are blocked. In the past, there were singular whitelists or blacklists. As the scripts or heuristic tables that are used to find viruses are universal, it is anticipated that the same tables are used when the remote device 12 is performing work-related functions as when the remote-device 12 is performing non-work-related functions, but as discussed, it is anticipated that the whitelisting/blacklisting be different when the remote device 12 is performing work-related functions as opposed to when the remote-device 12 is performing non-work-related functions.

These corporate security measures 502 consume resources on the remote devices 12, including storage resources, memory resources, and processing resources. As the remote devices 12 vary in capabilities, the corporate security measures 502 is tailored to the capabilities of each type/class of remote device 12. For example, a full set of corporate security measures 502 is loaded onto a remote device 12 that is a desktop computer while a subset of corporate security measures 502 is loaded onto a remote device 12 that is a smartphone, and an even smaller subset of corporate security measures 502 is loaded onto a remote device 12 that is a smartwatch. Likewise, in some embodiments, the corporate security measures 502 are configured based upon parameters such as the user (e.g., level within the corporation), the date/time of day (e.g., stricter security during working hours), an inherent threat level (e.g., when cyber-attacks are prevalent), location, etc. For example, the remote device 12 used by the CEO of a corporation has a blacklist containing very few items (basically unlimited access) while in their home country but when the remote device 12 is used in certain other countries, the blacklist is filled out with many items to provide enhanced protection until the remote device 12 returns to the home country.

Figure 8C:
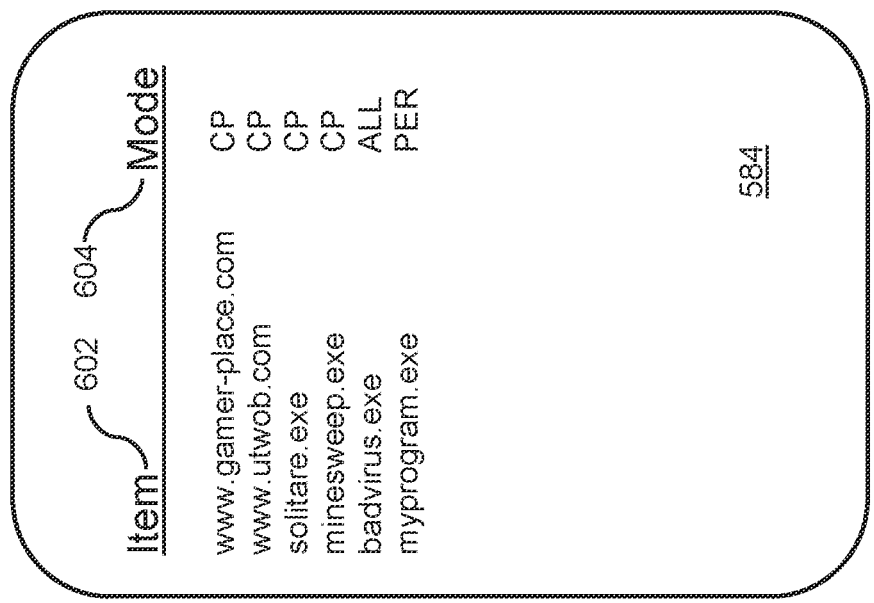
FIGS. 8A-8C illustrate examples of blacklists.
Figure 8B:
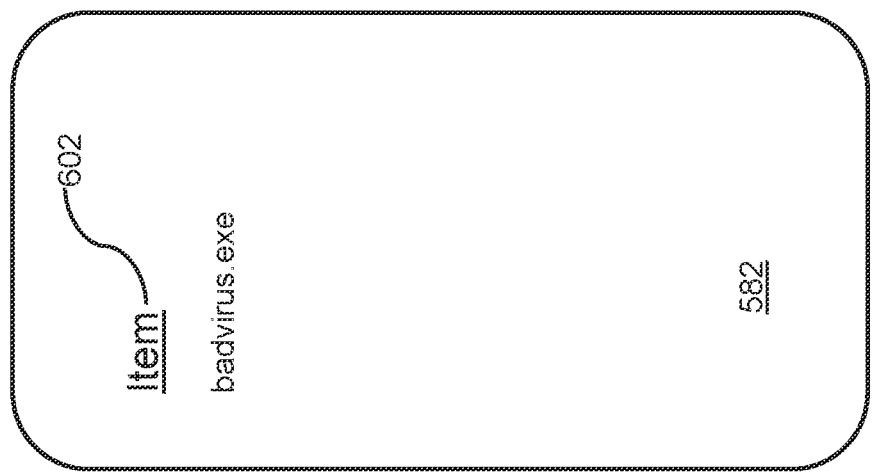
Figure 8A:

For this, either dual lists or segmented lists are provided. In dual lists as shown in FIGS. 8A-8B (blacklist) and 9A-9B (whitelist), there is one list (white and/or black) for when the remote device 12 is performing work-related functions and a different list (white and/or black) for when the remote-device 12 is performing non-work-related functions. In segmented lists as shown in FIGS. 8C (blacklist) and 9C (whitelist), there is one list (white and/or black) and each item in the list is marked as, for example, CP or corporate, for when the remote device 12 is performing work-related functions and marked PER of personal for when the remote-device 12 is performing non-work-related functions. In the segmented lists, it is also anticipated that some items are marked ALL, or all modes, and apply to both corporate work and personal use of the remote device 12.

Referring to FIGS. 8A-8C, examples of blacklists 580/582/584 are shown. FIGS. 8A-8B show a dual blacklist configuration such that, when the remote computer 12 is performing work-related activities, the first blacklist 580 is used to determine which items 602 (programs/scripts and/or websites) are blocked. In this, when the remote computer 12 is not performing work-related activities, the second blacklist 582 is used to determine which programs/scripts are blocked and what web sites are blocked. Therefore, in this example, when the remote computer 12 is performing work-related activities, the remote computer 12 uses the first blacklist 580 and is prevented from executing solitare.exe, minesweep.exe, and badvirus.exe; and prevented from browsing to gamer-place.com and utwob.com, but when the remote computer 12 is performing non-work-related activities, the remote computer 12 uses the second blacklist 582 and is allowed to execute solitare.exe, minesweep.exe; and allowed to browse to gamer-place.com and utwob.com; badvirus.exe is still blocked.

FIG. 8C shows a segmented blacklist 584 configuration such that, when the remote computer 12 is performing work-related activities, entries with a mode 604 of "CP" in the segmented blacklist 584 are used to determine which programs/scripts are blocked. When the remote computer 12 is performing non-work-related activities, entries with a mode 604 of "PER" in the segmented blacklist 584 are used to determine which programs/scripts are blocked. Entries with a mode 604 of "ALL" in the segmented blacklist 584 are used to determine which programs/scripts are blocked independent of the mode.

Therefore, in this example, when the remote computer 12 is performing work-related activities, the remote computer 12 uses entries in the segmented blacklist 584 that have the mode 604 of "CP," preventing from executing solitare.exe, minesweep.exe, and badvirus.exe; and prevented from browsing to gamer-place.com and utwob.com and when the remote computer 12 is performing non-work-related activities, the remote computer 12 uses entries in the segmented blacklist 584 that have the mode 604 of "PER," preventing execution of myprogram.exe. In either mode, execution of badvirus.exe. is prevented.

Figure 9C:
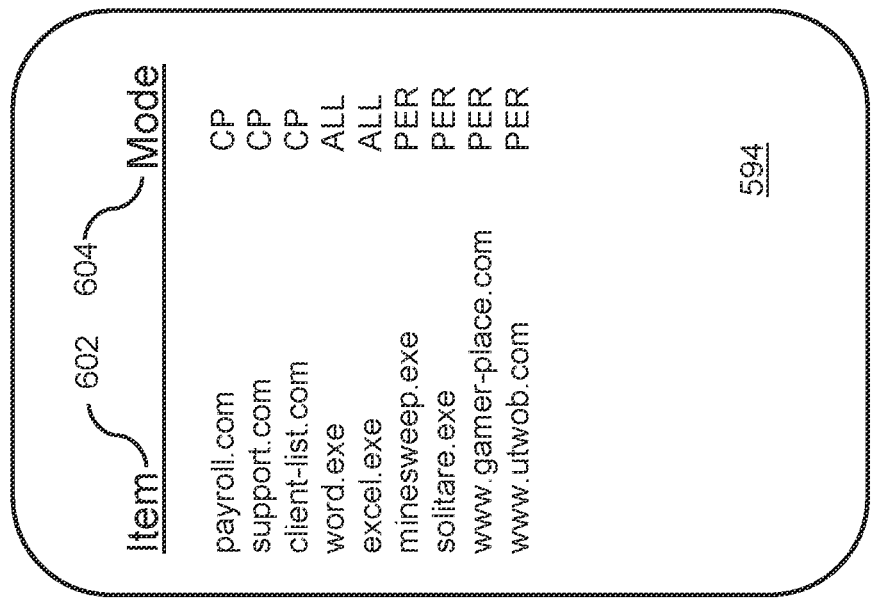
FIGS. 9A-9C illustrate examples of whitelists.
Figure 9B:
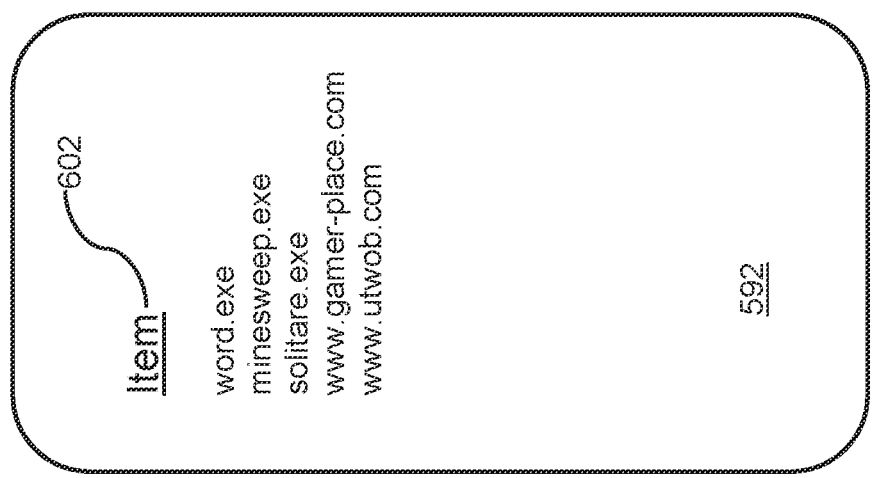
Figure 9A:

Referring to FIGS. 9A-9C, examples of whitelists 590/592/594 are shown. FIGS. 9A-9B show a dual whitelist configuration such that, when the remote computer 12 is performing work-related activities, the first whitelist 590 is used to determine which programs/scripts are allowed and which web sites are allowed. When the remote computer 12 is not performing work-related activities, the second whitelist 592 is used to determine which programs/scripts are allowed to run and which web sites are allowed. Therefore, in this example, when the remote computer 12 is performing work-related activities, the remote computer 12 uses the first whitelist 590 and is allowed to execute word.exe, excel.exe; and allowed to browse to payroll.com, support.com, and client-list.com, but when the remote computer 12 is performing non-work-related activities, the remote computer 12 uses the second whitelist 592 and is allowed to execute solitare.exe, minesweep.exe, word.exe; and allowed to browse to gamer-place.com and utwob.com.

FIG. 9C shows a segmented whitelist 594 configuration such that, when the remote computer 12 is performing work-related activities, entries with a mode 604 of "CP" in the segmented whitelist 594 are used to determine which programs/scripts/sites are allowed. When the remote computer 12 is performing non-work-related activities, entries with a mode 604 of "PER" in the segmented whitelist 594 are used to determine which programs/scripts/sites are allowed. In some embodiments, entries with a mode 604 of "ALL" in the segmented whitelist 594 are used to determine which programs/scripts are allowed independent of the mode. Therefore, in this example, when the remote computer 12 is performing work-related activities, the remote computer 12 uses entries in the segmented whitelist 594 that have the mode 604 of "CP" or "ALL," allowing execution of word.exe, excell.exe; and allowing browsing to payroll-.com, support.com, and client-list.com and when the remote computer 12 is performing non-work-related activities, the remote computer 12 uses entries in the segmented whitelist 594 that have the mode 604 of "PER" or "ALL," allowing execution of word.exe, excell.exe, minesweep.exe, and solitare.exe and allowing browsing to gamer-place.com and utwob.com.

Figure 10:
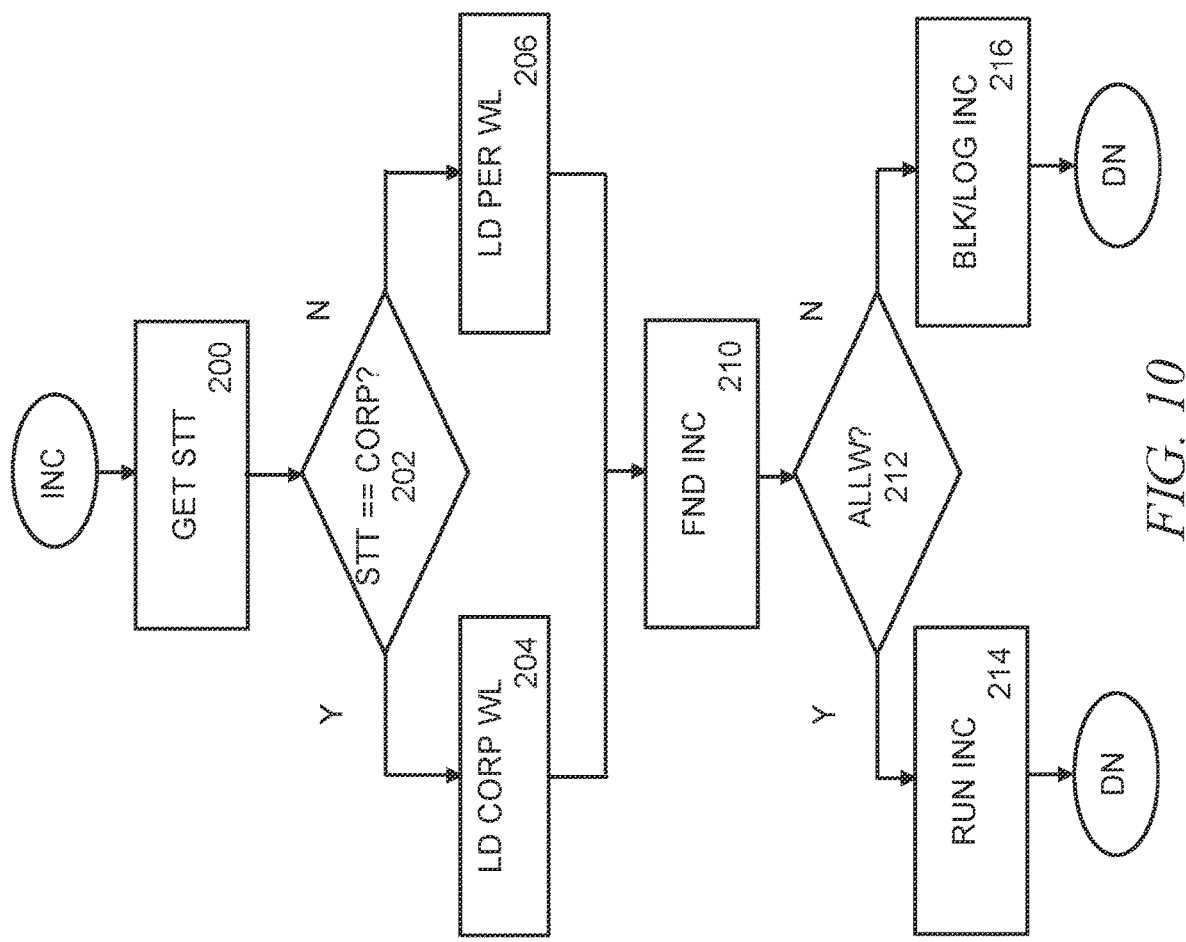
FIGS. 10-13 illustrate exemplary program flows of the system for improved security.
Figure 11:
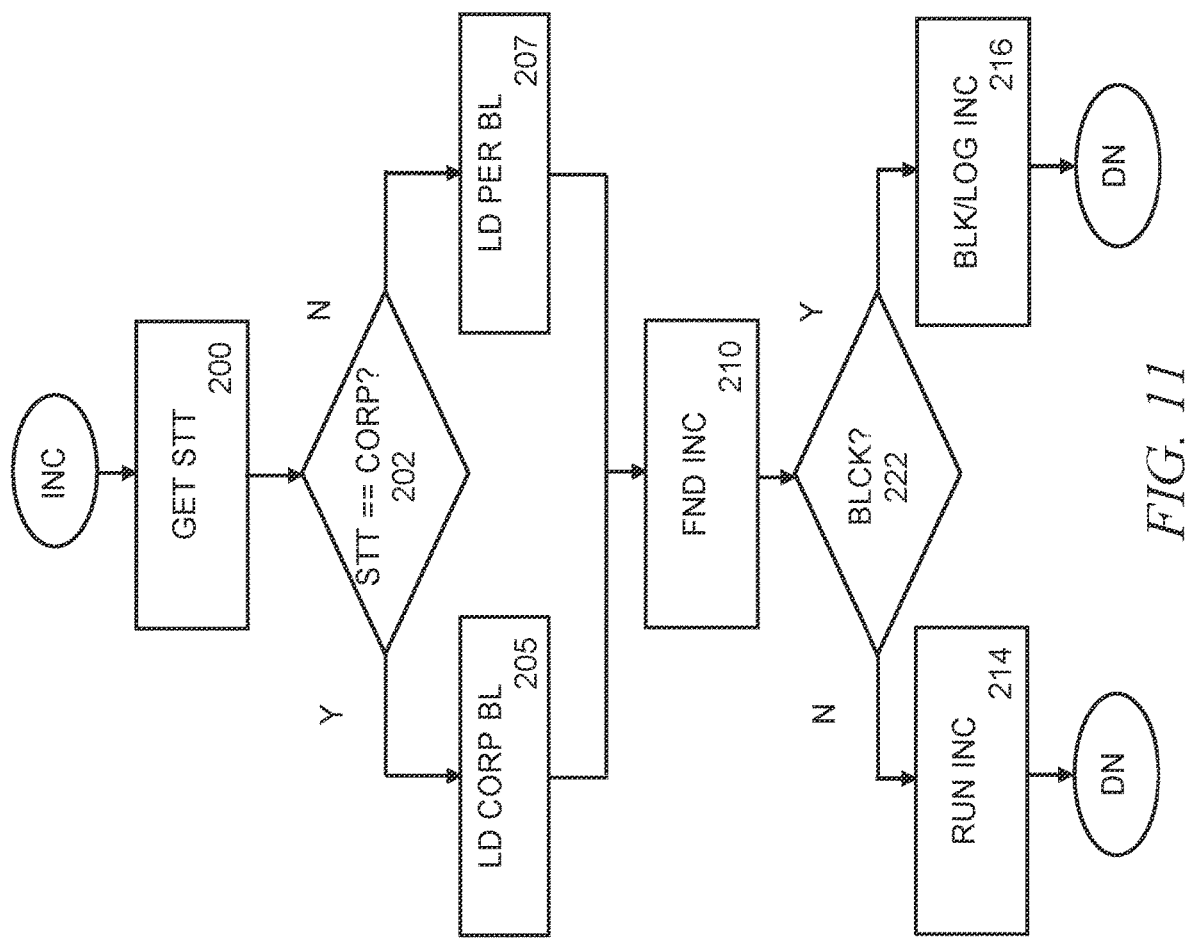
Figure 12:
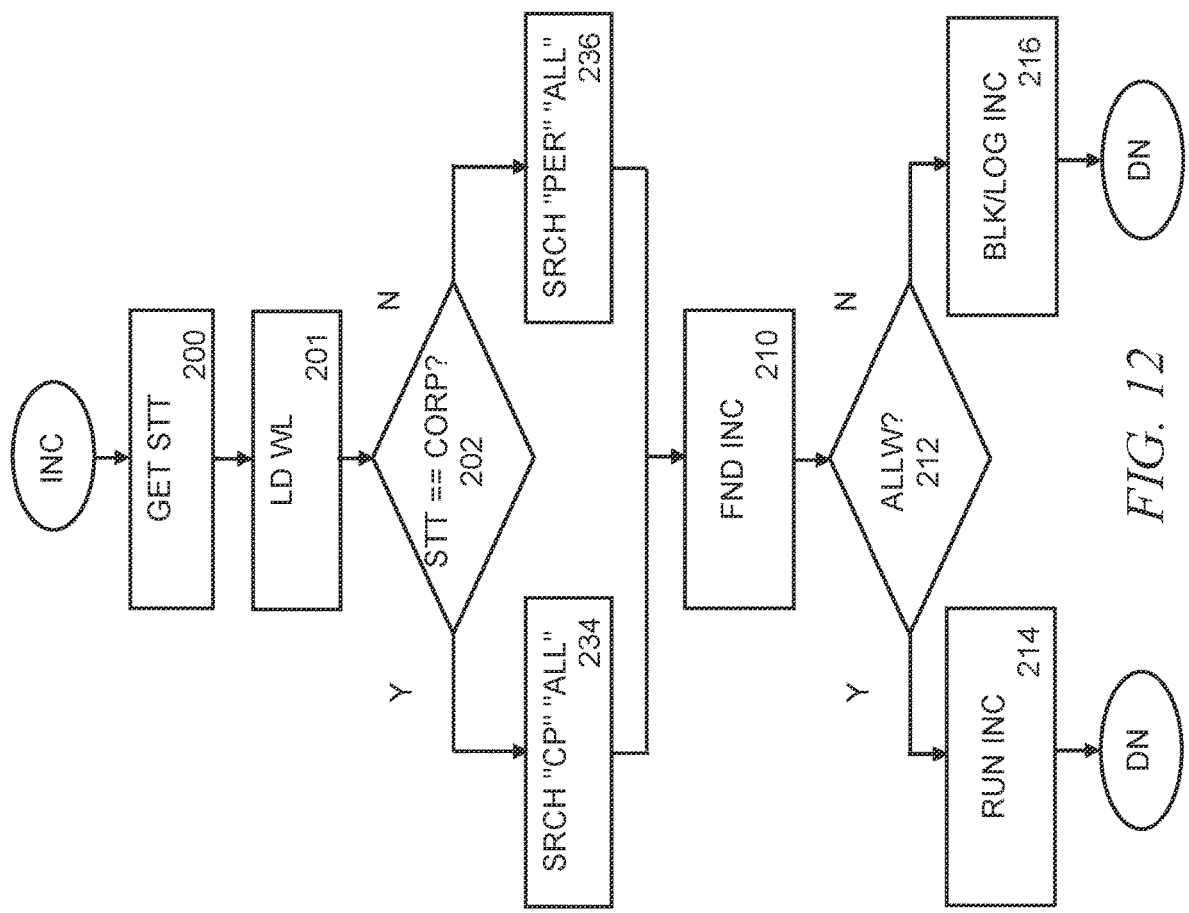
Figure 13:
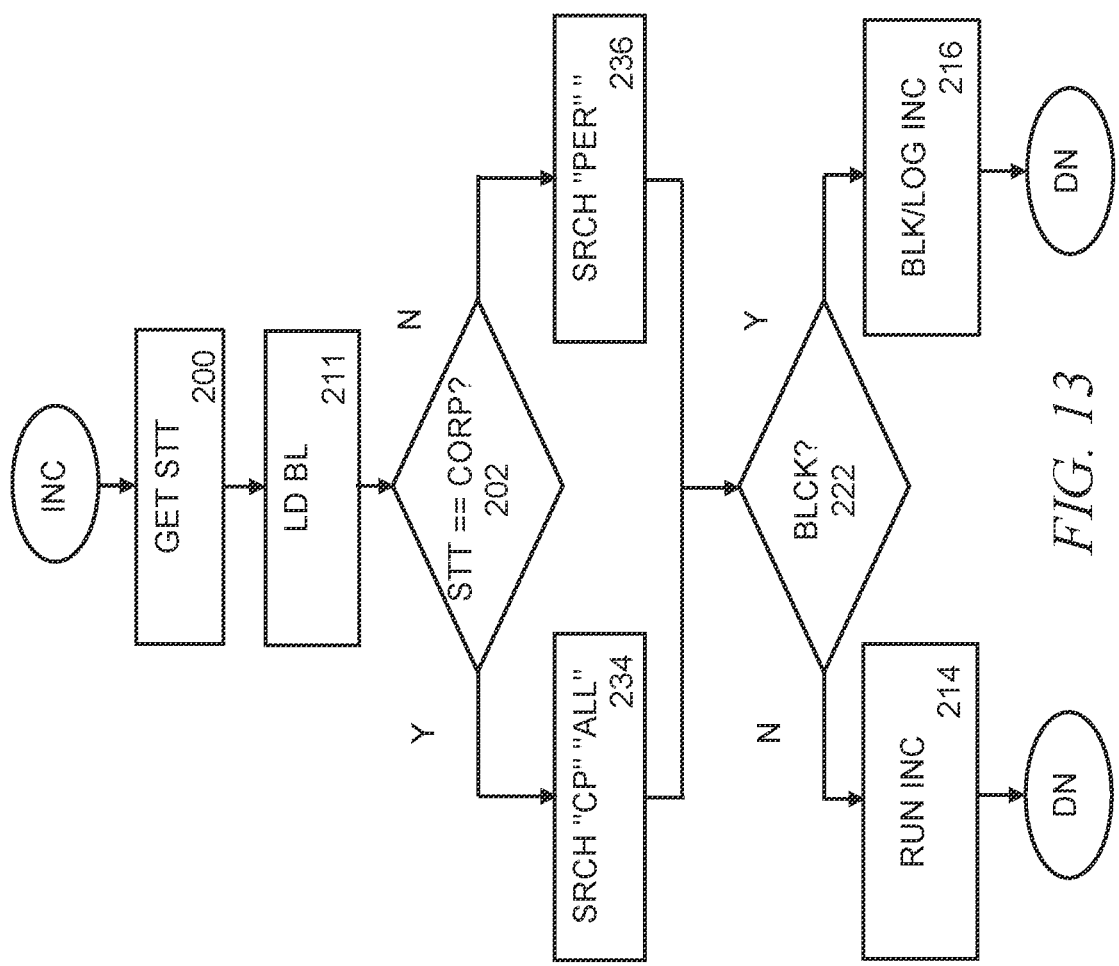

Referring to FIGS. 10-13, exemplary program flows of the system for improved security are shown. In FIG. 10, a program flow in which dual whitelists are used is shown. In FIG. 11, a program flow in which a segmented whitelist is used is shown. In FIG. 12, a program flow in which dual blacklists are used is shown. In FIG. 13, a program flow in which a segmented blacklist is used is shown. Note in these examples, the protection file is shown as a whitelist or black list, but any protection file is anticipated such as a virus protection file, firewall settings, communications adapter settings, etc.

In FIG. 10, an incoming item has been detected such as an attempt to access a web page, an attempt to run a script, an attempt to run a program such as solitare.exe, etc. The software determines 200 whether the system is performing work-related activities, for example, by time-of-day, by finding a connection to a work-related computer system, etc. If the system is performing work-related activities 202, then the corporate whitelist is loaded 204 as the protection file, e.g., as the code for evaluating the resource, which is a program in this example. If the system is not performing work-related activities 202, then the personal whitelist is loaded 206 as the protection file. Whichever whitelist was loaded is then searched 210 for the incoming attempt and if a match is found in the loaded whitelist 212 (e.g., the program is in the loaded whitelist) the incoming item is allowed to run 214. If no match is found in the loaded whitelist 212 (e.g., the program is absent from the loaded whitelist) the incoming item is blocked 216 and, in some embodiments, an entry is written to a logfile.

In FIG. 11, an incoming item has been detected such as an attempt to access a web page, an attempt to run a script, an attempt to run a program such as solitare.exe, etc. The software detects 200 whether the system is performing work-related activities, for example, by time-of-day, by finding a connection to a work-related computer system, etc. If the system is performing work-related activities 202, then the corporate blacklist is loaded 205. If the system is not performing work-related activities 202, then the personal blacklist is loaded 207. Whichever blacklist was loaded is then searched 210 for the incoming attempt and if a match is not found in the loaded blacklist 222 (e.g., the program is not in the loaded blacklist) the incoming item is allowed to run 214. If a match is found in the loaded blacklist 222 (e.g., the program is in the loaded blacklist), then the incoming item is blocked 216 and, in some embodiments, an entry is written to a logfile.

In FIG. 12, an incoming item has been detected such as an attempt to access a web page, an attempt to run a script, an attempt to run a program such as solitare.exe, etc. In this example, there is a single whitelist for both corporate and personal use modes and the software loads that whitelist 201. The software detects 200 whether the system is performing work-related activities, for example, by time-of-day, by finding a connection to a work-related computer system, etc. If the system is performing work-related activities 202, the whitelist is searched for corporate entries 234 (e.g., those having a mode of "CP") that match the incoming item. If the system is not performing work-related activities 202, then the whitelist is searched for personal entries 236 (e.g., those having a mode of "PER") that match the incoming item. If a match is found in the whitelist 212 (e.g., the program/item is in the whitelist with the corresponding mode) the incoming item is allowed to run 214. If no match is found in the loaded whitelist 212 (e.g., the program is absent from the loaded whitelist) the incoming item is blocked 216 and, in some embodiments, an entry is written to a logfile.

In FIG. 13, an incoming item has been detected such as an attempt to access a web page, an attempt to run a script, an attempt to run a program such as solitare.exe, etc. In this example, there is a single blacklist for both corporate and personal use modes and the software loads 211 that whitelist. The software detects 200 whether the system is performing work-related activities, for example, by time-of-day, by finding a connection to a work-related computer system, etc. If the system is performing work-related activities 202, then the blacklist is searched 234 for an entry matching the incoming item and marked corporate (e.g., "CP"). If the system is not performing work-related activities 202, then the blacklist is searched 236 for an entry matching the incoming item and marked personal (e.g., "PER"). If the item (e.g., program, web site) is found in the blacklist 222 (e.g., the item is blocked), then the incoming item is blocked 216 and, in some embodiments, an entry is written to a logfile. If the item (e.g., program, web site) is not found in the blacklist 222 (e.g., the program is not blocked) the incoming item is allowed to run 214.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for computer security of a remote device having a processor, the system comprising:
   software running on the processor;

when an attempt to access a resource, the software first determines an operating mode of the remote device;

when the operating mode of the remote device is a corporate operating mode, then the software selects a corporate protection file as a protection file;

otherwise, when the operating mode of the remote device is a personal operating mode, then the software selects a personal protection file as a protection file; and the software validates the resource using the protection file and when the protection file indicates that the resource is approved, access to the resource is provided; otherwise, access to the resource is prevented.

2. The system of claim 1, wherein the corporate protection file, the personal protection file, and the protection file are whitelists.

3. The system of claim 1, wherein the corporate protection file, the personal protection file, and the protection file are blacklists.

4. The system of claim 1, wherein the resource is a local file.

5. The system of claim 1, wherein the resource is a script file.

6. The system of claim 1, wherein the resource is a web site.

7. The system of claim 1, wherein the software determines the operating mode of the remote device based upon a geographical location of the remote device.

8. The system of claim 1, wherein the software determines the operating mode of the remote device based upon a time-of-day at the remote device.

9. The system of claim 1, wherein the personal protection file is configured based upon capabilities of the remote device.

10. The system of claim 1, wherein the personal protection file is configured based upon a level in a corporation of a user of the remote device.

11. A method of protecting remote device that has a processor, the method comprising:

installing security software on the remote device, the security software running before providing general access of the remote device by a user;

upon attempting access to a resource, the security software determining an operating mode of the remote device;

when the operating mode indicates a corporate-use operating mode, the security software evaluating the resource based upon corporate-use rules and if the corporate-use rules allow access to the resource, the security software allowing access to the resource, otherwise the security software preventing access to the resource; and when the operating mode indicates a personal-use operating mode, the security software evaluating the resource based upon personal-use rules and if the personal-use rules allow access to the resource, the security software allowing access to the resource.

12. The method of claim 11, wherein the step of determining an operating mode of the remote device comprises determining if the remote device is connected to at least one corporate resource and when the remote device is connected to the at least one corporate resource, setting the operating mode to indicates the corporate-use operating mode.

13. The method of claim 11, wherein the corporate-use rules and the personal-use rules comprise items selected from a group consisting of whitelists, blacklists, virus scanner data files, and firewall settings.

14. The method of claim 11, wherein the corporate-use rules and the personal-use rules are further configured based upon a level within a corporation of the user.

* * * * *